H. J. GERNET.
SUPPORT FOR AUTOMOBILE LAMPS AND NUMBER PLATES.
APPLICATION FILED OCT. 16, 1909.
954,387.
Patented Apr. 5, 1910.
2 SHEETS—SHEET 1.
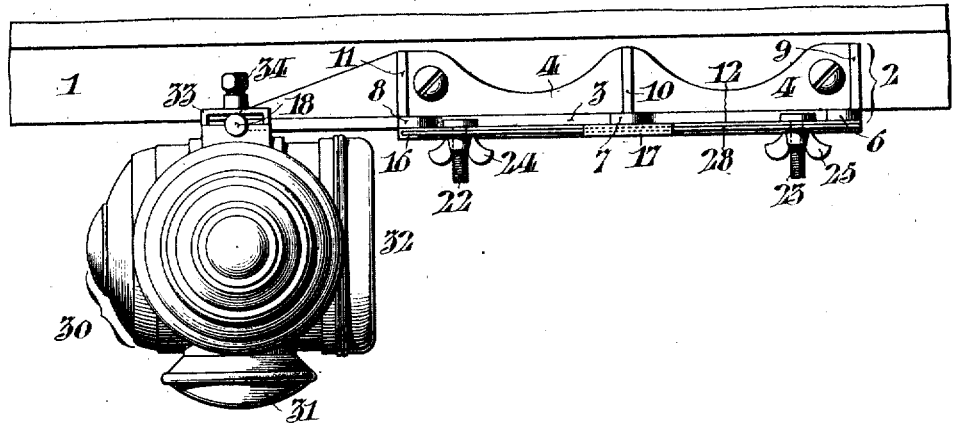
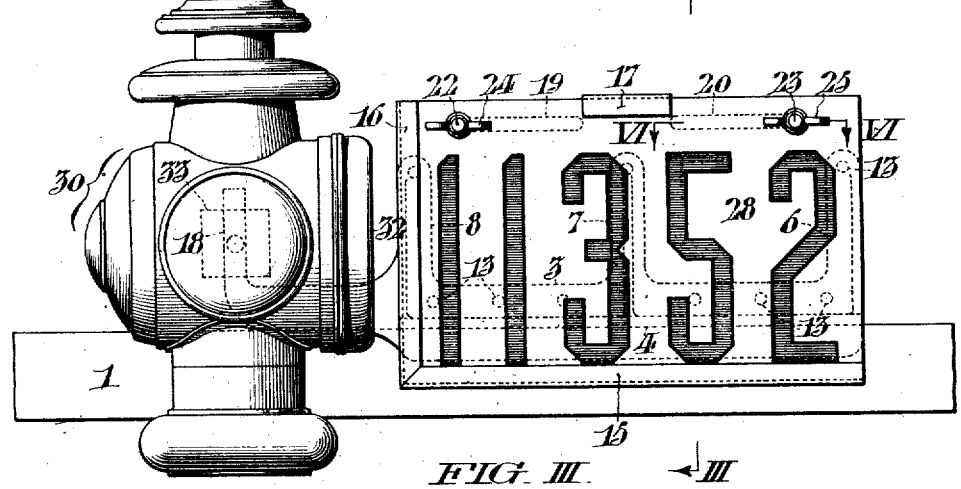
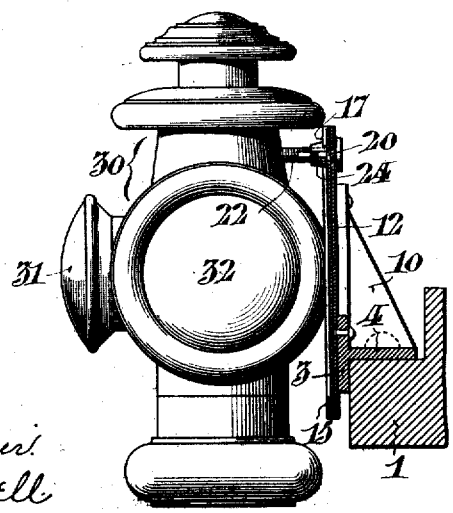
Inventor
Harry J. Gernet, H. J. GERNET.
SUPPORT FOR AUTOMOBILE LAMPS AND NUMBER PLATES.
APPLICATION FILED OCT. 16, 1909.
954,387.
Patented Apr. 5, 1910.
2 SHEETS—SHEET 2.
FIG. IV.
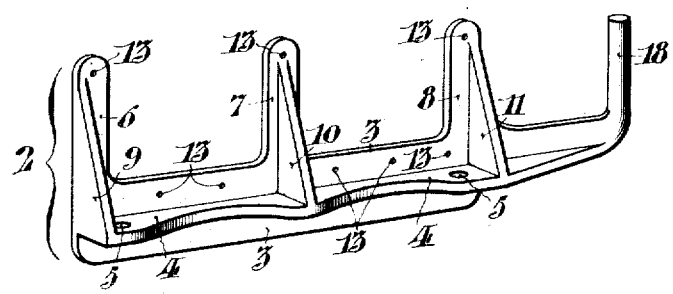
FIG. V.
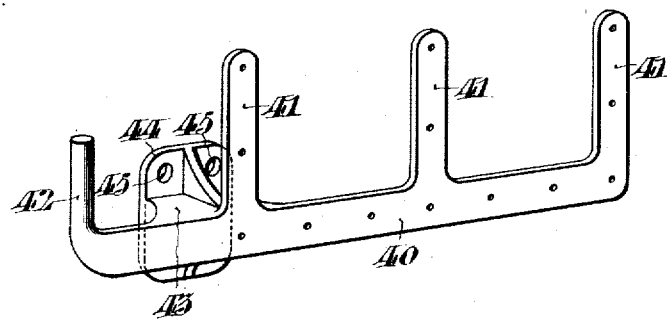
FIG. VI.
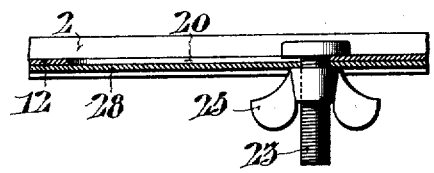
Inventor
Harry J. Gernet,
By Paul
Attorneys
Witnesses
John C. Bergner
James H. Bell

UNITED STATES PATENT OFFICE.

HARRY J. GERNET, OF PHILADELPHIA, PENNSYLVANIA, ASSIGNOR OF ONE-HALF TO EDWARD F. GORMAN, OF PHILADELPHIA, PENNSYLVANIA.

SUPPORT FOR AUTOMOBILE LAMPS AND NUMBER-PLATES.

954,387.   Specification of Letters Patent.   Patented Apr. 5, 1910.

Application filed October 16, 1909. Serial No. 522,958.

*To all whom it may concern:*

Be it known that I, HARRY J. GERNET, of Philadelphia, in the county of Philadelphia and State of Pennsylvania, have invented a certain new and useful Support for Automobile Lamps and Number-Plates, whereof the following is a specification, reference being had to the accompanying drawings.

In said drawings, Figure I, represents a top or plan view of a support embodying my invention, equipped with the rear lamp of an automobile, and also with the plate bearing the license number. Fig. II, is a view thereof in elevation. Fig. III, is a sectional view on the line III, III, of Fig. II. Fig. IV, is a view in perspective of the main element of the support detached from the other parts. Fig. V, is a view in perspective of a main element, similar in construction to that of Fig. IV, excepting as to the detail of the means whereby it is secured to the automobile. Fig. VI, is a partial sectional view on the line VI, VI, of Fig. II, the scale being somewhat enlarged.

The object of my invention is to provide a convenient means for supporting in proper relation to one another, the rear lamp and the plate bearing the license number of an automobile, the purposes being to insure proper illumination of the number at night; to permit the removal of the lamp, and of the number plate with great facility; to enable the device to be used with plates of different sizes; and to provide a system of construction, whereby the support and its adjuncts can be securely mounted upon an automobile, and yet be readily detachable as a whole therefrom; and also to permit access to the parts immediately adjacent to the support, so as to facilitate the cleaning of said parts.

Referring to the accompanying drawings, 1, represents the cross-bar forming part of the chassis of an ordinary automobile and extending across the rear portion thereof, upon which the support and its adjuncts can be conveniently mounted.

The support as a whole is indicated at 2, and can be conveniently described by reference to the perspective view of Fig. IV. It comprises a frame having an elongated base piece 3, which, in this instance, is provided with a rearwardly projecting flange 4, arranged about midway of its vertical height, said flange having openings 5, to receive screw bolts whereby the flange may be secured to the horizontal surface of the cross-bar 1, as shown in Figs. I, and III. Extending vertically from said base piece are the uprights 6, 7, and 8, preferably three in number, as shown, whose faces on the side remote from the observer, in Fig. IV, are flush with the face of the base piece 3. These uprights may be braced by means of the rearwardly projecting buttress pieces 9, 10, and 11, respectively. At the extremity of the base piece, and in line with the uprights 6, 7, and 8, I provide the lamp rod 18, which is preferably cylindrical as shown, and which extends vertically upward to a height approximately the same as that of the uprights. A plate carrier 12, is attached to the uprights by means of screws passing through the holes 13, said carrier being a flat rectangular plate of metal having a projecting and upwardly re-turned flange 15, along its bottom edge, and a similar projecting and inwardly re-turned flange 16, along that edge which is in proximity to the lamp rod 18, and having in its upper portion a forwardly projecting and downwardly re-turned flange 17, which preferably only extends for a short distance as shown. Said plate is also provided with elongated horizontal slots 19, and 20, near its upper edge, adapted to receive the bolts 22, and 23, which are provided with wing nuts 24, and 25.

The grooves formed by the bottom flange 15, end flange 16, and short top flange 17, are adapted to receive snugly and retain the number plate 28, which is slid into position horizontally from the end of the structure which is at the right hand in Figs. I, and II. When seated in the grooves, the number plate is finally secured in position by means of the bolts 22, and 23, which are clamped against the front surface of the number plate, and the rear surface of the plate frame, as indicated. The slots 19, and 20, permit the device to readily receive and hold number plates of various lengths.

The lamp 30, is of the ordinary type for the rear lights of automobiles having the usual colored lens at 31, and a lateral lens or glass at 32, adapted to permit the illumination of the number plate. This lamp is provided with a rearwardly projecting socket 33, adapted to fit upon the lamp rod 18, the parts being secured together by means of the screw 34.

In the slightly varied form shown in Fig. V, the arrangement of the base piece 40, uprights 41, and lamp rod 42, is similar to that just described, but the means for securing the support to the chassis are different, in that they comprise a rearwardly projecting flange 43, having a vertical plate 44, provided with holes 45, for bolts, said plate being adapted to be affixed to a vertical face of the cross bar where the structure of the chassis renders this mode of arrangement preferable.

Having thus described my invention, I claim:

In a support for automobile lamps and number plates, the combination of a base piece having a plurality of uprights and a lamp rod arranged in parallel relation to one another; a plate carrier secured to said uprights, said plate carrier comprising grooves and flanges at its edges adapted to receive and retain a number plate; means for clamping a number plate against said carrier; and a rearwardly projecting support adapted to be mounted upon the cross bar of an automobile chassis, substantially as set forth.

In testimony whereof, I have hereunto signed my name, at Philadelphia, Pennsylvania, this fifteenth day of October 1909.

HARRY J. GERNET.

Witnesses:
JAMES H. BELL,
E. L. FULLERTON.